(12) United States Patent
Sakuja et al.

(10) Patent No.: US 12,241,394 B2
(45) Date of Patent: Mar. 4, 2025

(54) DUAL LEG AFTERTREATMENT SYSTEM

(71) Applicant: Cummins Power Generation Inc., Minneapolis, MN (US)

(72) Inventors: Ankit Sakuja, Charleston, SC (US); Travis Alva Anderson, Columbus, IN (US); Srinivas Chakravarthy Bathula, Columbus, IN (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 18/283,984

(22) PCT Filed: Mar. 24, 2022

(86) PCT No.: PCT/US2022/021804
§ 371 (c)(1),
(2) Date: Sep. 25, 2023

(87) PCT Pub. No.: WO2022/204437
PCT Pub. Date: Sep. 29, 2022

(65) Prior Publication Data
US 2024/0159180 A1 May 16, 2024

Related U.S. Application Data

(60) Provisional application No. 63/166,448, filed on Mar. 26, 2021.

(51) Int. Cl.
*F01N 11/00* (2006.01)
*F01N 3/08* (2006.01)
*F01N 3/20* (2006.01)

(52) U.S. Cl.
CPC ............ *F01N 11/00* (2013.01); *F01N 3/0842* (2013.01); *F01N 3/2053* (2013.01);
(Continued)

(58) Field of Classification Search
CPC ...... F01N 3/0842; F01N 3/2053; F01N 3/208; F01N 3/2066; F01N 11/00; F01N 13/087;
(Continued)

(56) References Cited

U.S. PATENT DOCUMENTS 5,983,627 A * 11/1999 Asik ..................... F01N 13/011
60/276
2011/0162350 A1 * 7/2011 Ponnathpur ............... F01N 9/00
60/274

(Continued)

FOREIGN PATENT DOCUMENTS

DE 10 2005 038 187 2/2007
DE 10 2008 022 998 12/2009
(Continued)

OTHER PUBLICATIONS

International Search Report and Written Opinion on PCT/US2022/021804 dated Jul. 21, 2022 (15 pages).

*Primary Examiner* — Binh Q Tran
(74) *Attorney, Agent, or Firm* — Foley & Lardner LLP

(57) ABSTRACT

A method of controlling an exhaust gas aftertreatment system includes receiving a plurality of emissions values from a plurality of sensors disposed in an aftertreatment system, determining a real-time conversion efficiency for one or more legs of the aftertreatment system based on the emissions values, determining a real-time conversion metric for the aftertreatment system based on the real-time conversion efficiency for the one or more legs, comparing the real-time conversion metric to an upper threshold value, and initiating a cleaning operation to clean the aftertreatment system based on a determination that the real-time conversion metric satisfies the upper threshold value.

20 Claims, 5 Drawing Sheets

(52) U.S. Cl.
CPC ...... *F01N 2250/12* (2013.01); *F01N 2410/02* (2013.01); *F01N 2410/12* (2013.01); *F01N 2510/02* (2013.01); *F01N 2550/10* (2013.01); *F01N 2560/026* (2013.01); *F01N 2900/04* (2013.01); *F01N 2900/0416* (2013.01); *F01N 2900/0418* (2013.01); *F01N 2900/0422* (2013.01); *F01N 2900/1621* (2013.01); *F01N 2900/1622* (2013.01)

(58) Field of Classification Search
CPC ............... F01N 13/107; F01N 2250/12; F01N 2410/02; F01N 2410/06; F01N 2410/12; F01N 2470/24; F01N 2510/02; F01N 2550/06; F01N 2550/10; F01N 2560/026; F01N 2560/14; F01N 2590/10; F01N 2610/02; F01N 2900/04; F01N 2900/0408; F01N 2900/0416; F01N 2900/0418; F01N 2900/0422; F01N 2900/1402; F01N 2900/1411; F01N 2900/1621; F01N 2900/1622; Y02T 10/40
See application file for complete search history.

(56) References Cited

U.S. PATENT DOCUMENTS

| | | | | |
|---|---|---|---|---|
| 2012/0204542 | A1* | 8/2012 | Norris | F01N 13/011 60/287 |
| 2012/0210697 | A1* | 8/2012 | Garimella | F01N 13/009 60/287 |
| 2013/0306171 | A1* | 11/2013 | Nagaoka | F01N 3/0814 137/551 |
| 2014/0116027 | A1 | 5/2014 | Ancimer | |
| 2016/0169784 | A1* | 6/2016 | Smith | F01N 9/002 73/23.33 |
| 2021/0062745 | A1* | 3/2021 | Russ | F02D 41/0052 |

FOREIGN PATENT DOCUMENTS

| | | |
|---|---|---|
| WO | WO-2006/095917 | 9/2006 |
| WO | WO-2012/051273 A1 | 4/2012 |

* cited by examiner

DUAL LEG AFTERTREATMENT SYSTEM

CROSS REFERENCE TO RELATED APPLICATIONS

The present application claims the benefit of and priority to U.S. Provisional Patent Application No. 63/166,448, filed Mar. 26, 2021, the entire contents of which are incorporated herein by reference.

TECHNICAL FIELD

The present disclosure relates to control systems and methods for engine exhaust aftertreatment systems.

BACKGROUND

Internal combustion engine systems include exhaust systems to route the flow of combustion gases away from the engine and to reduce the noise level of the engine during operation. The exhaust system may include an aftertreatment system to reduce levels of potentially harmful combustion gases that are introduced into the exhaust system. The aftertreatment systems are designed to meet stringent emissions regulations/standards that set quantitative limits on permissible amounts of specific pollutants that may be released from the internal combustion engine system into the environment.

SUMMARY

One embodiment of the present disclosure relates to a method of controlling an aftertreatment system. The method includes receiving a plurality of emissions values from a plurality of sensors disposed in an aftertreatment system, determining a real-time conversion efficiency for one or more legs of the aftertreatment system based on the plurality of emissions values, determining a real-time conversion metric for the aftertreatment system based on the real-time conversion efficiency for the one or more legs, comparing the real-time conversion metric to an upper threshold value, and initiating a cleaning operation to clean the aftertreatment system based on a determination that the real-time conversion metric satisfies the upper threshold value.

Another embodiment of the present disclosure relates to a control system for an aftertreatment system. The control system includes an engine outlet nitrogen oxide (NOx) sensor, a first system outlet NOx sensor, a second system outlet NOx sensor, a cleaning system, and a controller. The cleaning system is configured to clean at least one leg of the aftertreatment system. The controller is communicably coupled to the engine outlet NOx sensor, the first system outlet NOx sensor, the second system outlet NOx sensor, and the cleaning system. The controller is configured to (i) determine a real-time conversion efficiency for at least one of a first leg or a second leg based on data received form the engine outlet NOx sensor, the first system outlet NOx sensor, and the second system outlet NOx sensor; (ii) determine a real-time conversion metric for the aftertreatment system based on the real-time conversion efficiency; and (iii) control the cleaning system to initiate a cleaning operation to clean the aftertreatment system in response to the real-time conversion metric satisfying an upper threshold value.

These and other features, together with the organization and manner of operation thereof, will become apparent from the following detailed description when taken in conjunction with the accompanying drawings.

BRIEF DESCRIPTION OF THE FIGURES

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
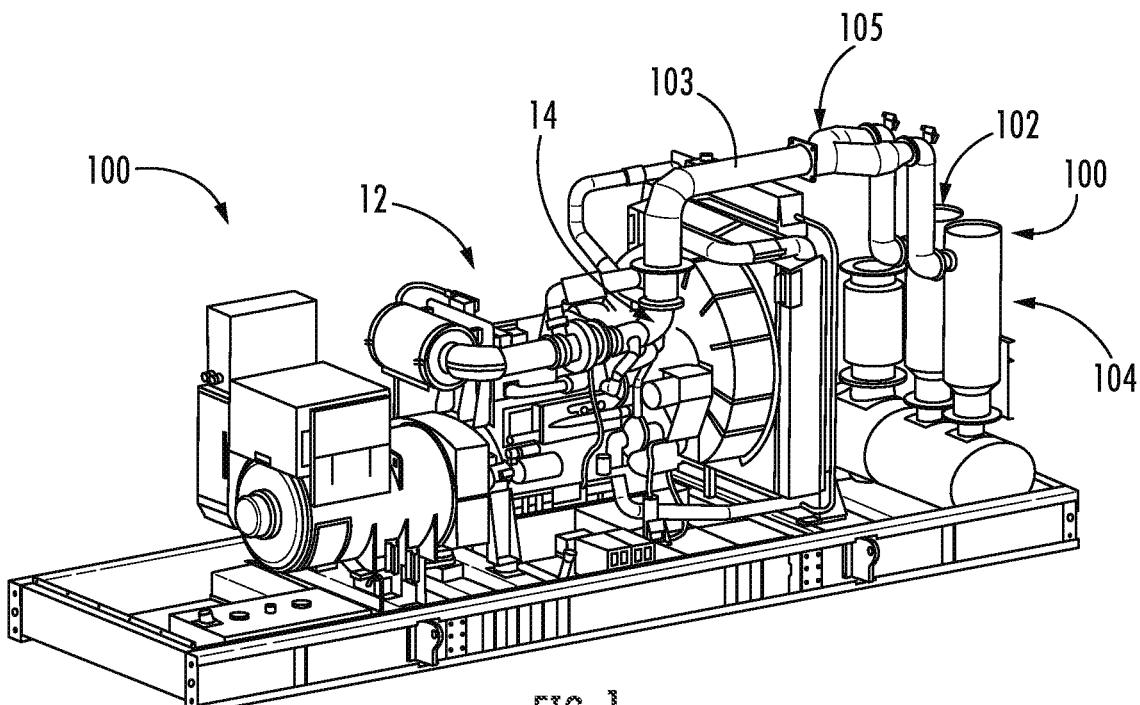
FIG. 1 is a perspective view of an internal combustion engine system for a generator assembly, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate to methods and systems for detecting flow imbalance within exhaust aftertreatment systems for internal combustion engines. In particular, embodiments described herein relate generally to a dual leg aftertreatment system that utilizes measurements from nitrogen oxide (NOx) sensors to detect flow imbalance through each leg of the aftertreatment system, and that takes corrective action to improve flow uniformity between legs based on the NOx measurements.

In various traditional internal combustion engine systems, the exhaust aftertreatment system may include a diesel particulate filer, catalysts, and/or other components to reduce harmful gas and particulate matter emissions from the exhaust system. In some instances, and in particular for large diesel engine systems, the aftertreatment system may include multiple portions in the form of a plurality of legs that are arranged in parallel to increase the overall flow capacity for the aftertreatment system.

During engine operation, the components of the aftertreatment system may become clogged with dirt, soot, and other particulate matter and deposits. These flow obstructions increase the pressure drop across individual legs and can ultimately lead to flow imbalance between the legs, which can cause emissions non-compliance with respect to gaseous pollutants, particulate matter, and/or other chemicals (e.g., ammonia, etc.). To prevent flow imbalance, a cleaning and/or regeneration operation may be performed to burn off or otherwise remove these deposits from the aftertreatment system. In at least one embodiment, the cleaning operation may include controlling the engine system (e.g., combustion levers such as fuel injection timing, fuel rail pressure, fuel charge flow, adding post fueling (post fuel injections), etc.) to increase the temperature of exhaust gases entering the aftertreatment system. In other embodiments, a different cleaning operation may be performed to remove particulate matter and deposits from the aftertreatment system. Such cleaning and regeneration processes must be performed periodically to ensure continued emissions compliance. In some circumstances, these processes may result in unnecessary cleaning cycles and/or increased fuel consumption by the engine system.

The aftertreatment system of the present disclosure mitigates the aforementioned issues by using gas sensors within the aftertreatment system to detect flow imbalance and ammonia slip (e.g., leakage), and to control operation of the cleaning system to improve flow uniformity. In at least one embodiment, the aftertreatment system includes a control system that coordinates operation of the various components of the aftertreatment system. The control system utilizes measurements from nitrogen oxide (NOx) sensors that are positioned within the aftertreatment system to evaluate the relative performance of different legs. In particular, the control system is configured to utilize measurements from an engine outlet NOx sensor positioned upstream of the aftertreatment system (e.g., between the aftertreatment system and the engine, at the outlet of the turbocharger, etc.) and system NOx sensors positioned within the flow stream at the outlet of each leg. The real-time emissions values from the system NOx sensors are compared with the emissions values at the engine outlet NOx sensor to calculate the performance of each individual leg (e.g., a reduction in the measured quantity of NOx and/or other gaseous pollutants across the leg). The control system calculates a real-time performance metric that is indicative of an overall flow imbalance based on the performance of each individual leg, and compares the real-time performance metric to one or more thresholds stored in system memory to determine whether a cleaning and/or regeneration cycle is needed. In response to determining that one or more cycles are needed, the control system initiates a cleaning and/or regeneration operation to remove particulate matter and deposits from the aftertreatment system.

In at least one embodiment, the control system is configured to determine at least one threshold based, in part, on the initial performance of the aftertreatment system (e.g., the performance of a newly installed aftertreatment system, after de-greening and/or after a short aging period to stabilize the catalyst, and/or after replacement of one or more catalysts for the aftertreatment system). For example, the control system may include adaptation functionality that calibrates the flow imbalance between different legs based on the initial performance of the aftertreatment system, or after replacement of one or more catalysts within the aftertreatment system. Among other benefits, such adaptation features reduce the risk of false detection of flow imbalance that may be caused by different arrangements of the legs and part to part variation of components within the aftertreatment system (e.g., the position of each leg downstream from a flow splitter pipe, the position of the exhaust fluid dosing system, the length of each leg, etc.). These and other advantageous features will become apparent in view of the present disclosure.

The various concepts introduced above and discussed in greater detail below may be implemented in any of numerous ways, as the described concepts are not limited to any particular manner of implementation. Examples of specific implementations and applications are provided for illustrative purposes.

Various numerical values herein are provided for reference purposes. Unless otherwise indicated, all numbers expressing quantities of properties, parameters, conditions, and so forth, used in the specification and claims are to be understood as being modified in all instances by the term "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "approximately" when used before a numerical designation, e.g., a quantity and/or an amount including range, indicates approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Referring now to FIG. 1, an internal combustion engine system 10 is shown, according to at least one embodiment. The internal combustion engine system 10 includes an engine 12 and an aftertreatment system 100 coupled to an outlet of the engine 12. In the embodiment of FIG. 1, the engine 12 is a diesel engine that is powered by diesel fuel (e.g., a Tier 4 inline diesel engine, etc.). In another embodiment, the engine 12 may be another type of internal combustion engine or driver. In various embodiments, the engine 12 may be a high horse power (HHP) diesel engine, such as, for example, an engine capable of providing power in the range of 500 hp to 4,500 hp or more. In the embodiment of FIG. 1, the engine system 10 is used to power an electric generator (e.g., an alternator, etc.) that is used to produce electricity (e.g., power). In another embodiment, the engine system 10 may be used to power a truck, a boat, a locomotive, or another type of vehicle (e.g., an on-road or off-road vehicle). In yet another embodiment, the engine system 10 may be used in various industrial applications to drive a pump, hydraulic system, or another type of system.

Figure 2:
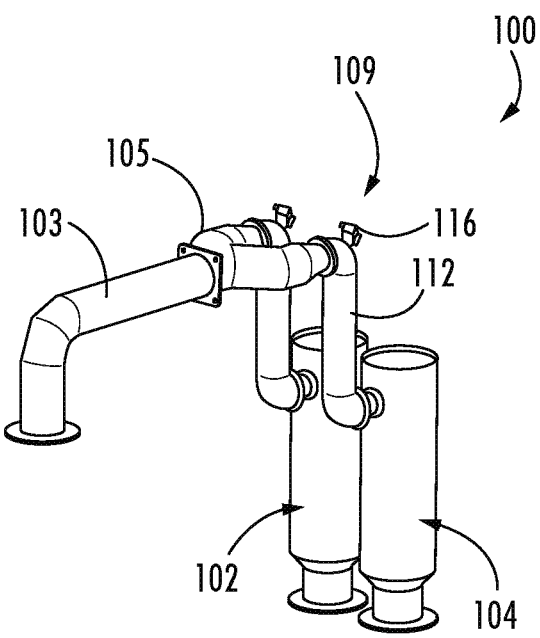
FIG. 2 is a perspective view of an exhaust aftertreatment system for the internal combustion engine system of FIG. 1, according to an embodiment.

As shown in FIGS. 1-2, the aftertreatment system 100 is connected to an outlet of a turbocharger 14 of the engine 12 and is configured to receive combustion gases that are exhausted from the engine 12. In the embodiment of FIGS.

1-2, the aftertreatment system 100 is a dual-leg aftertreatment system that includes two separate flow legs (e.g., banks, etc.), shown as first leg 102 and second leg 104, each configured to reduce levels of pollutants in the exhaust gas stream. As shown in FIG. 2, the aftertreatment system 100 also includes an inlet pipe 103 that is coupled to the engine 12. In the embodiment of FIG. 2, the inlet pipe 103 extends from and is fluidly coupled to the outlet of the turbocharger 14. The aftertreatment system 100 also includes a flow splitter pipe 105 (e.g., Y-pipe, etc.) that extends between the inlet pipe 103 and both (e.g., each of) the first leg 102 and the second leg 104, and that divides the flow from the inlet pipe 103 between the first leg 102 and the second leg 104.

Figure 3:
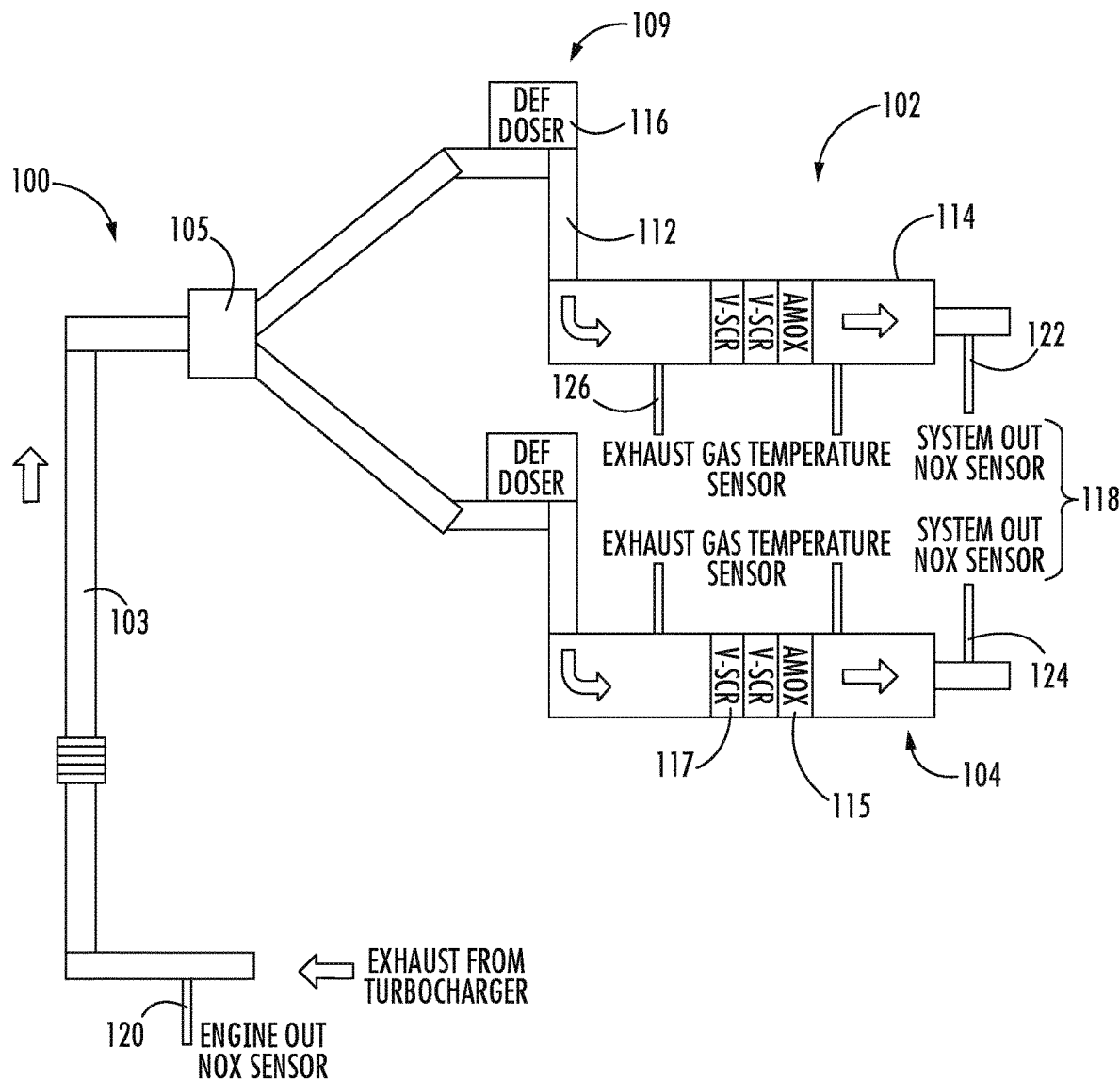
FIG. 3 is a schematic representation of the exhaust aftertreatment system of FIG. 2.

FIG. 3 shows a schematic representation of the aftertreatment system of FIGS. 1-2. As shown, the first leg 102 and the second leg 104 of the aftertreatment system 100 each include the same set of components. For example, each leg includes a dosing system 109 that is structured to administer diesel exhaust fluid into the leg to facilitate the reduction of air pollution in the exhaust gas (e.g., to lower the concentration of nitrogen oxides (NOx) in the exhaust gas, etc.), as will be further described. The dosing system 109 includes an intermediate pipe 112 that extends between a catalyst housing 114 and the flow splitter pipe 105, and a fluid doser 116 (e.g., injector, dosing supply, etc.) that is coupled to the intermediate pipe 112 and is structured to inject diesel exhaust fluid into the intermediate pipe 112 during operation of the aftertreatment system. The arrangement of the dosing system along each leg (e.g., the position of the fluid doser 116, etc.) may be different in various embodiments.

The aftertreatment system 100 also includes a catalyst housing 114 which is structured to contain the various filters and catalysts that are used to reduce levels of particulate matter and NOx from the exhaust gas stream. In at least one embodiment, the catalyst housing 114 forms part of a selective catalytic reduction (SCR) system for converting nitrogen oxides into diatomic nitrogen (N2) and water, with the aid of a reductant such as ammonia, urea, or the like. As shown in FIG. 3, the catalyst housing 114 contains a plurality of catalysts, including an ammonia oxidation catalyst 115 and at least one vanadia catalyst 117. In other embodiments, the number and arrangement of catalysts may be different. In at least one embodiment, the catalyst housing 114 also includes a diesel particulate filter to capture diesel particulate matter or soot from the exhaust gas stream. In other embodiments, the aftertreatment system 100 may include different components.

As shown in FIG. 3, the aftertreatment system 100 also includes a plurality of sensors 118 disposed at different locations within and/or along the aftertreatment system 100. The sensors 118 include a plurality of emissions sensors structured to measure a level of gaseous pollutant at different points along the aftertreatment system 100. As shown in FIG. 3, the emissions sensors include an engine outlet NOx sensor 120 positioned/disposed in the inlet pipe 103 proximate or at the outlet of the turbocharger 14, and structured to measure a level of NOx entering the aftertreatment system 100. The emissions sensors also include two system outlet NOx sensors, including a first system outlet NOx sensor 122 disposed proximate or at an outlet (e.g., in a conduit at the outlet) of the first leg 102 and structured to measure a level of NOx leaving the first leg 102; and a second system outlet NOx sensor 124 disposed proximate or at an outlet of the second leg 104 and structured to measure a level of NOx leaving the second leg 104. In other embodiments, the emissions sensors may also include ammonia sensors, and/or another type of gas/chemical sensor.

The plurality of sensors also includes a plurality of exhaust gas temperature sensors 126 positioned in the first leg 102 and the second leg 104 (e.g., coupled to the catalyst housing 114), before and after the catalysts in each of the first leg 102 and the second leg 104, and structured to measure a temperature difference across the first leg 102 and the second leg 104 (e.g., across the catalysts in the first leg 102 and the second leg 104). The sensors 118 may further include at least one sensor to monitor operating parameters of the engine 12 (see FIG. 1). For example, the sensors 118 may include an engine speed sensor that monitors a rotational speed of the engine (e.g., revolutions per minute), a flow sensor that monitors a fueling rate for the engine, and/or another type of engine operation sensor. In other embodiments, the aftertreatment system 100 may include additional, fewer, and/or different sensors.

Figure 4:
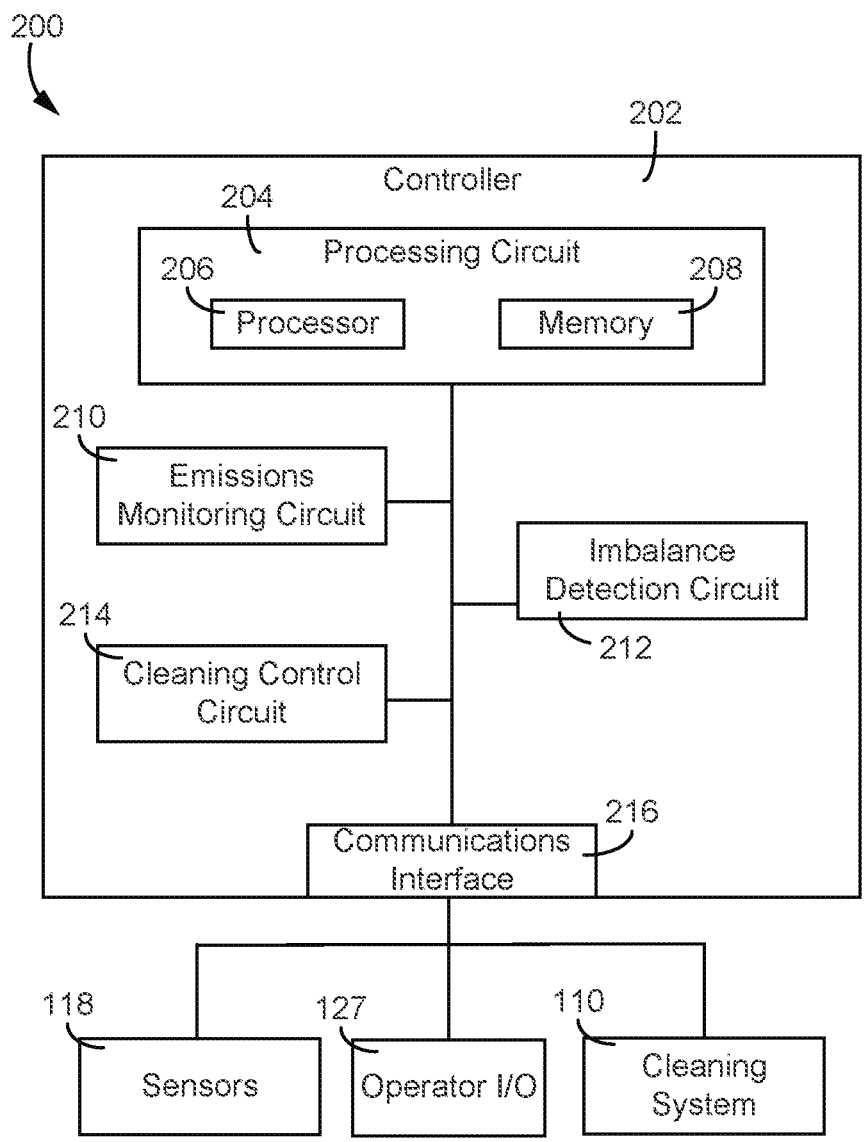
FIG. 4 is a schematic diagram of a control system for the exhaust aftertreatment system of FIG. 2, according to an embodiment.

As shown in FIG. 4, the aftertreatment system 100 (e.g., of FIG. 3) also includes a control system 200 including a controller 202 (e.g., control unit, etc.) that is structured to interpret data from various sensors (see also FIG. 3) disposed within the aftertreatment system 100, to detect flow imbalance between the first leg 102 and the second leg 104, and to control operation of a cleaning system 110 (e.g., engine system 10, fuel injection system, engine control unit, etc.) to clean and/or regenerate the aftertreatment system 100 (e.g., to clean and/or regenerate the catalysts, etc.). As shown in FIG. 4, the control system 200 (e.g., controller 202) is communicably coupled to various other parts of the aftertreatment system 100 and/or the internal combustion engine system 10.

Components of the aftertreatment system 100 may communicate with each other or with components external to the aftertreatment system 100 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In at least one embodiment, a controller area network (CAN) bus provides the exchange of signals, information, and/or data. The CAN bus includes any number of wired and wireless connections.

In some embodiments, and as shown in FIG. 4, the aftertreatment system 100 further includes an operator I/O device 127 that enables an operator and/or technician to communicate with the control system 200 and controller 202. By way of example, the operator I/O device 127 may include, but is not limited to, a handheld programing tool that a technician may use to access diagnostic information about the aftertreatment system 100 (e.g., the health of the sensors 118, etc.) and/or to signal to the aftertreatment system 100 that new parts or components have been installed (e.g., a new catalyst, etc.). In this way, a technician may use the I/O device 127 to initiate calibration and/or adaptation of the control system 200 and to establish performance thresholds for the flow imbalance detection algorithm, as is further described below. The I/O device 127 may include an interactive display, a touchscreen device, one or more buttons and switches, and the like, or any combination thereof.

The controller 202 may be structured as one or more electronic control units (ECUs). In particular, in some embodiments, the controller 202 may include multiple sub-controllers or may be a distributed controller. As such, the controller 202 may be separate from or included with at least one of an engine control unit for the engine system 10.

As shown in FIG. 4, the controller 202 includes a processing circuit 204 having a processor 206 and a memory 208; an emissions monitoring circuit 210; an imbalance detection circuit 212; a cleaning control circuit 214; and a communications interface 216. As described herein, the controller 202 is structured to (i) detect flow imbalance between each leg of the aftertreatment system 100 (se FIG. 3), and (ii) to control the cleaning and/or regeneration of each leg of the aftertreatment system 100.

In one configuration, the emissions monitoring circuit 210, the imbalance detection circuit 212, and the cleaning control circuit 214 are configured by computer-readable media that are executable by a processor, such as the processor 206. As described herein and amongst other uses, the circuitry facilitates performance of certain operations to enable reception and transmission of data. For example, the circuitry may provide an instruction (e.g., command, etc.) to, e.g., acquire data. In this regard, the circuitry may include programmable logic that defines the frequency of acquisition of the data and/or other aspects of the transmission of the data. In particular, the circuitry may be implemented by computer readable media which may include code written in any programming language including, but not limited to, Java, JavaScript, Python or the like and any conventional procedural programming languages, such as the "C" programming language or similar programming languages. The computer readable program code may be executed on one processor or multiple remote processors. In the latter scenario, the remote processors may be connected to each other through any type of network (e.g., a CAN bus, etc.).

In another configuration, the emissions monitoring circuit 210, the imbalance detection circuit 212, and/or the cleaning control circuit 214 are embodied as hardware units, such as electronic control units. As such, the emissions monitoring circuit 210, the imbalance detection circuit 212, and/or the cleaning control circuit 214 may be embodied as one or more circuitry components including, but not limited to, processing circuitry, network interfaces, peripheral devices, input devices, output devices, sensors, etc. In some embodiments, the emissions monitoring circuit 210, the imbalance detection circuit 212, and/or the cleaning control circuit 214 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the emissions monitoring circuit 210, the imbalance detection circuit 212, and/or the cleaning control circuit 214 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. Thus, the emissions monitoring circuit 210, the imbalance detection circuit 212, and/or the cleaning control circuit 214 may also include programmable hardware devices such as field programmable gate arrays, programmable array logic, programmable logic devices or the like. In this regard, the emissions monitoring circuit 210, the imbalance detection circuit 212, and the cleaning control circuit 214 may include one or more memory devices for storing instructions that are executable by the processor(s) of the emissions monitoring circuit 210, the imbalance detection circuit 212, and/or the cleaning control circuit 214. The one or more memory devices and processor(s) may have the same definition as provided below with respect to the memory 208 and the processor 206. Thus, in this hardware unit configuration, the emissions monitoring circuit 210, the imbalance detection circuit 212, and/or the cleaning control circuit 214 may be dispersed throughout separate locations in the engine system 10 (e.g., separate control units, etc.). Alternatively, and as shown, the emissions monitoring circuit 210, the imbalance detection circuit 212, and/or the cleaning control circuit 214 may be embodied in or within a single unit/housing, which is shown as the controller 202.

In the example shown, the controller 202 includes the processing circuit 204 having the processor 206 and memory 208. The processing circuit 204 may be structured or configured to execute or implement the instructions, commands, and/or control processes described herein with respect to the emissions monitoring circuit 210, the imbalance detection circuit 212, and/or the cleaning control circuit 214. Thus, the depicted configuration represents the aforementioned arrangement where the emissions monitoring circuit 210, the imbalance detection circuit 212, and/or the cleaning control circuit 214 are embodied as machine or computer-readable media. However, as mentioned above, this illustration is not meant to be limiting as the present disclosure contemplates other embodiments such as the aforementioned embodiment where the emissions monitoring circuit 210, the imbalance detection circuit 212, and/or the cleaning control circuit 214, or at least one circuit of the emissions monitoring circuit 210, the imbalance detection circuit 212, and/or the cleaning control circuit 214, are configured as a hardware unit. All such combinations and variations are intended to fall within the scope of the present disclosure.

The processor 206 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the emissions monitoring circuit 210, the imbalance detection circuit 212, and/or the cleaning control circuit 214 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 208 (e.g., RAM, ROM, Flash Memory, hard disk storage, etc.) may store data and/or computer code for facilitating the various processes described herein. The memory 208 may be communicably connected to the processor 206 to provide computer code or instructions to the processor 206 for executing at least some of the processes described herein. Moreover, the memory 208 may be or include tangible, non-transient volatile memory or non-volatile memory. Accordingly, the memory 208 may include database components, object code components, script components, or any other type of information structure for supporting the various activities and information structures described herein.

The communications interface 216 may include wired and/or wireless interfaces (e.g., jacks, antennas, transmitters, receivers, transceivers, wire terminals, etc.) for conducting data communications with various systems, devices, or networks. For example, the communications interface 216 may include an Ethernet card and port for sending and receiving data via an Ethernet-based communications network and/or a Wi-Fi transceiver for communicating via a wireless communications network. The communications interface 216 may be structured to communicate via local area networks or wide area networks (e.g., the Internet, etc.) and may use a variety of communications protocols (e.g., IP, local area network (LAN), controller area network (CAN), J1939, local interconnect network (LIN), Bluetooth, ZigBee, radio, cellular, near field communication, etc.).

The communications interface 216 of the controller 202 may facilitate communication between and amongst the controller 202 and one or more components of the aftertreatment system 100 and/or engine system 10 (e.g., the sensors 118, the operator I/O device 127, the cleaning system 110, etc.). Communication between and amongst the controller 202 and the components of the aftertreatment system 100 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a CAN bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The emissions monitoring circuit 210 is structured to receive operations data regarding the aftertreatment system 100. For example, from the sensors 118, the I/O device 127, and the cleaning system 110. The operations data may include raw measurement signals from the sensors 118 (e.g., a voltage output from the sensors). The emissions monitoring system 210 may be structured to convert the raw measurement signals to performance metrics for the aftertreatment system 100, such as emissions values that are indicative of a level of gaseous pollutant at different locations within the aftertreatment system 100. In at least one embodiment, the emissions monitoring circuit 210 is structured to determine a real-time conversion efficiency for at least one of the first leg or the second leg of the aftertreatment system 100 (e.g., each leg of the aftertreatment system 100) based on data received from the sensors (e.g., the engine outlet NOx sensor, the first system outlet NOx sensor, and the second system outlet NOx sensor). In at least one embodiment, the real-time conversion efficiency is indicative of a percent decrease in the amount of gaseous pollutant across the leg (e.g., across the catalyst(s) within each leg, from an inlet end of the leg to the outlet end of the leg, etc.).

The gaseous pollutant may be NOx, ammonia, or the like. For example, the emissions monitoring circuit 210 may be configured to convert the raw signal from each of the NOx sensors to determine a real-time NOx level at each sensor (e.g., using a lookup table, a calibration curve, etc.). The emissions monitoring circuit 210 may then calculate the conversion efficiency by comparing the change in the real-time NOx level across the leg; for example, between the system outlet NOx sensors (e.g., the first system outlet NOx sensor 122, the second system outlet NOx sensor 124) at the outlet of the leg, and the engine outlet NOx sensor 120, as shown in FIG. 3, as will be further described.

The imbalance detection circuit 212 is structured to determine the flow imbalance between each leg of the aftertreatment system 100 and to issue commands to initiate cleaning and/or regeneration of one or more legs based on the amount of flow imbalance. In at least one embodiment, the imbalance detection circuit 212 is structured to determine the flow imbalance based on the conversion efficiency for each leg of the aftertreatment system (e.g., based on the conversion efficiencies determined by the emissions monitoring circuit 210), for example, by calculating a real-time conversion metric that is indicative of the relative conversion efficiency between each leg, as will be further described. The imbalance detection circuit 212 may then compare the real-time conversion metric with at least one threshold value to determine whether a cleaning and/or regeneration cycle is required. For example, in the event the real-time conversion metric satisfies an upper threshold value, the imbalance detection circuit 212 may be structured to send a signal to the cleaning control circuit 214 to perform a cleaning and/or regeneration cycle. In another embodiment, the imbalance detection circuit 212 may be structured to initiate and/or update a counter and/or monitor based on a deviation of the real-time conversion metric from various thresholds, as will be further described.

The imbalance detection circuit 212 may also be structured to determine the threshold values that are used to evaluate whether the amount of flow imbalance is within acceptable operating limits (e.g., whether the aftertreatment system 100 is operating within regulatory limits for emissions compliance). For example, the imbalance detection circuit 212 may be structured to monitor a calibration parameter stored in memory 208, and to determine whether recalibration or adaptation of the control algorithm is required based on the parameter. In the event that a recalibration/adaptation is needed (e.g., due to a replacement of one or more components of the aftertreatment system 100, etc.), the imbalance detection circuit 212 may be structured to issue one or more control signals to the engine system 10 (e.g., engine 12) to perform the calibration and/or adaptation, to establish a baseline operating characteristic for each leg of the aftertreatment system 100, and to determine threshold values from the baseline operating characteristic, as will be further described.

The cleaning control circuit 214 is structured to control the cleaning system 110 based on signals from the imbalance detection circuit 212. For example, the cleaning control circuit 214 may be structured to determine, based on the signal from the imbalance detection circuit 212, which of the legs is in need of cleaning/regeneration. The cleaning control circuit 214 is also structured to control the duration of the cleaning and/or regeneration cycle for one or more legs of the aftertreatment system 100. For example, the cleaning control circuit 214 may be structured to transmit a control signal to one or more engine subsystems to increase the temperature of exhaust gases entering and flowing through the one or more legs of the aftertreatment system 100 over a period of time, based on a cleaning period that is stored in memory 208. For example, the cleaning control circuit 214 may be structured to control injection timing for one or more fuel injectors, fuel rail pressure, charge flow, post fuel injection, and the like to increase exhaust gas temperature and to facilitate removal of particulate matter and deposits from the one or more legs. In some embodiments, the cleaning control circuit 214 may be structured to adjust the cleaning period based on the extent of the flow imbalance (e.g., based on the rate of increase in the flow imbalance, etc.). For example, when the rate of increase exceeds a first threshold, the cleaning control circuit 214 may initiate an adjustment of the cleaning period. In some embodiments, the cleaning control circuit 214 may be structured to adjust the cleaning period by searching through a lookup table and/or by using an empirically derived algorithm to determine the appropriate cleaning period from the amount and/or severity of the flow imbalance. In some embodiments, the cleaning control circuit 214 may use various combinations of the foregoing techniques.

Figure 5:
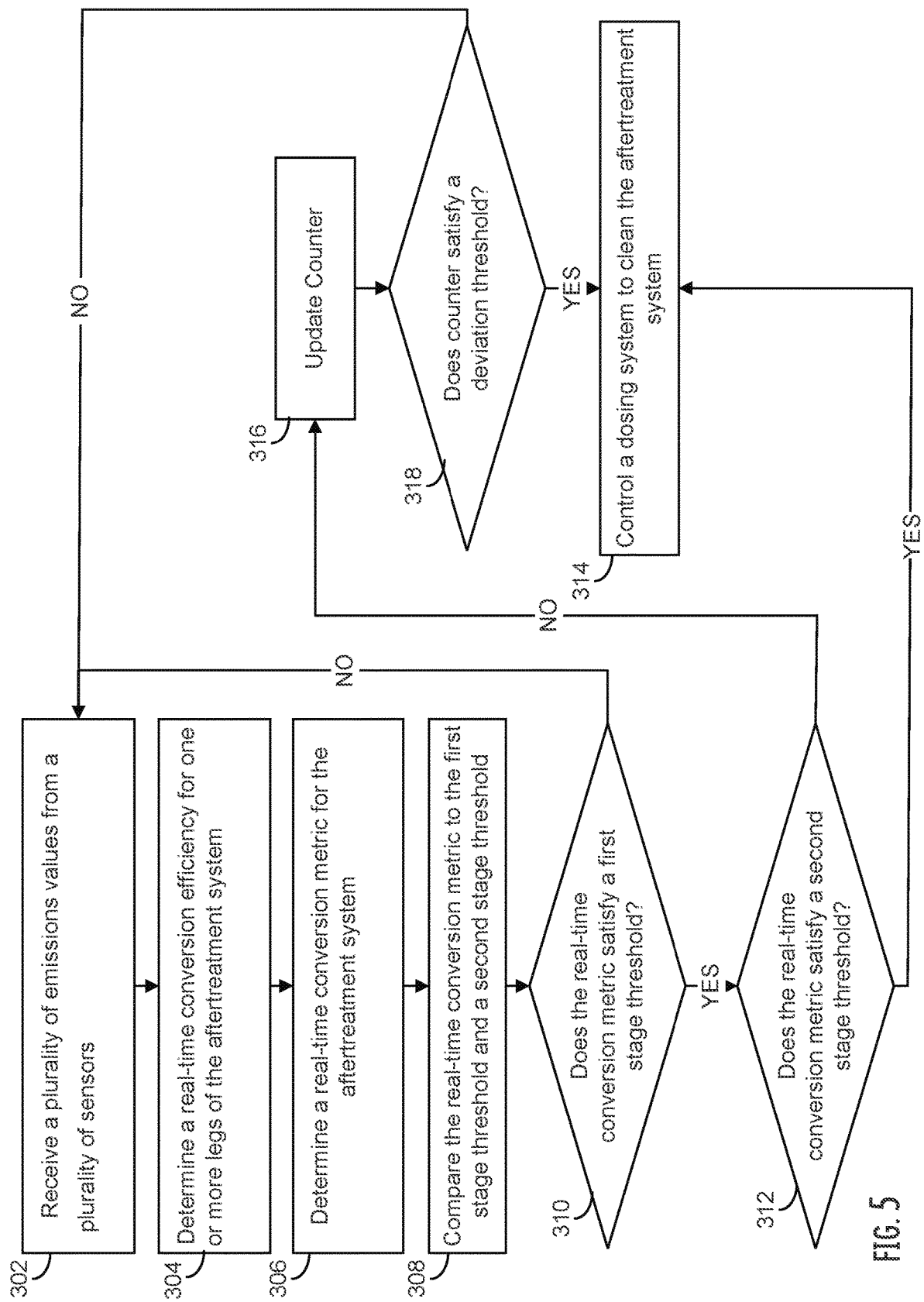
FIG. 5 is a block diagram of a method of resolving flow imbalance in an exhaust aftertreatment system, according to an embodiment.

Referring now to FIG. 5, a method 300 for detecting flow imbalance and performing a cleaning operation is shown, according to at least one embodiment. The method 300 may be implemented with the aftertreatment system 100 and the controller 202 of FIGS. 3-4. As such, the method 300 may be described with regard to FIGS. 3-4.

At 302, a controller (e.g., the controller 202, the emissions monitoring circuit 210, etc.) receives a plurality of emissions values from a plurality of sensors disposed in an aftertreatment system (e.g., the aftertreatment system 100). Operation 302 may include receiving signals (e.g., voltages) from the plurality of sensors and converting the signals to corresponding emissions values by using a calibration equation, or by searching through a lookup table that includes emissions values as a function of sensor voltage. For example, the controller may receive a voltage value from a NOx sensor and search through the lookup table to determine an amount of NOx that corresponds with the voltage value. In some instances, the controller may interpolate between values in the lookup table to determine the amount of NOx. In at least one embodiment, operation 302 includes determining the emission value both upstream and downstream of each leg of the aftertreatment system. In at least one embodiment, the emissions values include an amount and/or level of NOx at the location of the sensor. For example, operation 302 may include receiving an engine outlet NOx value from an engine outlet NOx sensor (e.g., engine outlet NOx sensor 120) disposed upstream of the aftertreatment system; receiving a first system outlet NOx value from a first system outlet NOx sensor disposed at an outlet end of a first leg of the aftertreatment system (e.g., first system outlet NOx sensor 122); and receiving a second system outlet NOx value from a second system outlet NOx sensor disposed at an outlet end of a second leg of the aftertreatment system (e.g., second system outlet NOx sensor 124).

At 304, the controller (e.g., the controller 202, the emissions monitoring circuit 210, etc.) determines a real-time (e.g., present, current, most recent, etc.) conversion efficiency for one or more (e.g., each) leg of the aftertreatment system based on the emissions values. In at least one embodiment, the real-time conversion efficiency is indicative of a reduction in the amount of gaseous pollutant across each leg of the aftertreatment system. For example, determining the real-time conversion efficiency (CE) can include determining a reduction in the amount of NOx across each leg of the aftertreatment system relative to an amount of NOx entering the aftertreatment system, as shown in equation (1) below:

$$CE = \frac{NOx_{out} - NOx_{in}}{NOx_{in}} \quad (1)$$

where $NOx_{out}$ is an amount of NOx leaving the leg and $NOx_{in}$ is an amount of NOx entering the leg. This implementation is shown schematically for the case of a dual leg aftertreatment system in FIG. 6, in which $CE_L$ indicates the real-time conversion efficiency of a first leg (e.g., left bank, etc.) of the aftertreatment system and $CE_R$ indicates the real-time conversion efficiency of a second leg (e.g., right bank, etc.) of the aftertreatment system.

At 306, the controller (e.g., the controller 202, the imbalance detection circuit 212, etc.) determines a real-time conversion metric for the aftertreatment system based on the real-time conversion efficiency of one or more legs of the aftertreatment system. In at least one embodiment, the real-time conversion metric is indicative of a relative conversion efficiency between the one or more legs of the aftertreatment system or an amount of ammonia slip between the one or more legs. For example, in the dual leg aftertreatment system of FIG. 6, operation 306 may include calculating a ratio, shown as $CE_{ratio}$, between the real-time conversion efficiency in each leg/bank of the aftertreatment system, by dividing a maximum value of the real-time conversion efficiency between the two legs by a minimum value of the real-time conversion efficiency between the two legs, as shown in equation (2) below.

$$\frac{\text{Max}(CE_L, CE_R)}{\text{Min}(CE_L, CE_R)} \quad (2)$$

Operation 306 may further include determining, by the controller, a relative blockage between the one or more legs and/or which leg of the aftertreatment system is experiencing the greatest blockage by iterating through a list of the real-time conversion efficiencies for each leg and comparing the relative conversion efficiencies. In some embodiments, the controller may be configured to prioritize the legs to perform a blockage-clearing action (e.g., to perform a cleaning and/or regeneration operation) based on the determination of the relative blockage and/or of which legs are experiencing blockages.

At 308-312, the controller (e.g., the controller 202, the imbalance detection circuit 212, etc.) determines if the flow imbalance is within acceptable operating limits for the aftertreatment system. In at least one embodiment, the controller compares the real-time conversion metric to multiple threshold values, and takes action depending on which of the threshold values is satisfied. As used herein, the term "satisfied" refers to a scenario in which the real-time conversion metric falls outside of an acceptable range based on the threshold value (e.g., the real-time conversion metric exceeds the threshold value, the real-time conversion metric is greater than or approximately equal to the threshold value, etc.). For example, in the implementation of FIG. 5, the method 300 compares the real-time conversion metric to two different threshold values, including (1) a first threshold value (e.g., lower threshold value, first stage threshold, etc.) that is indicative of variations in the real-time conversion metric that are due to inherent component variations and part-to-part variations between the same exhaust system components (e.g., tolerances in the design of the catalyst, the arrangement and/or length of ducting between each leg of the aftertreatment system, normal variations in the size and/or position of sensors that can contribute to increased restriction on one or more legs relative to the others, performance differences between an aged and unaged catalyst, etc.); and (2) a second threshold value (e.g., upper threshold value, second stage threshold, etc.) that is indicative of variations in the real-time conversion metric that arise due to flow imbalance and/or ammonia slip, and which force the aftertreatment system to operate outside of the allowable operating range that is needed to maintain emissions compliance.

In at least one embodiment, the threshold values may be based on a fixed percentage deviation from a nominal real-time conversion metric. For example, the first threshold value may correspond with a deviation of approximately 10% from a nominal real-time conversion metric. The second threshold value may correspond with a deviation of approximately 20% from a nominal real-time conversion metric. In other embodiments, the threshold values (e.g., the first threshold value, the second threshold value, etc.) may be determined based on (e.g., relative to) a baseline conversion metric. In at least one embodiment, the baseline conversion metric is indicative of (e.g., corresponds with) at least one of a level of flow imbalance between one or more legs (e.g., through each leg, etc.) of the aftertreatment system or an amount of ammonia slip between the one or more legs of a newly installed aftertreatment system portion (e.g., in a new/clean/regenerated state and/or with at least one new catalyst, such as in a de-greened state, etc.).

In at least one embodiment, method 300 includes performing an adaptation and/or calibration of the controller. The adaptation may include querying, by the controller (e.g., the controller 202, the imbalance detection circuit 212, etc.), an adaptation signal and/or flag from memory to determine whether an adaptation/calibration of the aftertreatment system should be performed. The controller may query the adaptation signal and/or flag at startup, before performing further operations. The adaptation signal and/or flag may be modified via the I/O device (e.g., a service tool, etc.), for example, after installing a new catalyst into the aftertreatment system or after performing other cleaning and/or maintenance operations. In response to the adaptation signal and/or flag, the controller may be structured to control the engine system while monitoring the real-time conversion metric. The controller may continue monitoring the real-time conversion metric over an adaptation period or until the performance of the aftertreatment system (as indicated by the real-time conversion metric) stabilizes (e.g., until the rate of change in the real-time conversion metric satisfies a calibration threshold saved in memory, etc.). At this point, the controller may update the baseline conversion metric based on the real-time conversion metric (e.g., may set the baseline conversion metric equal to the real-time conversion metric, etc.).

Figure 6:
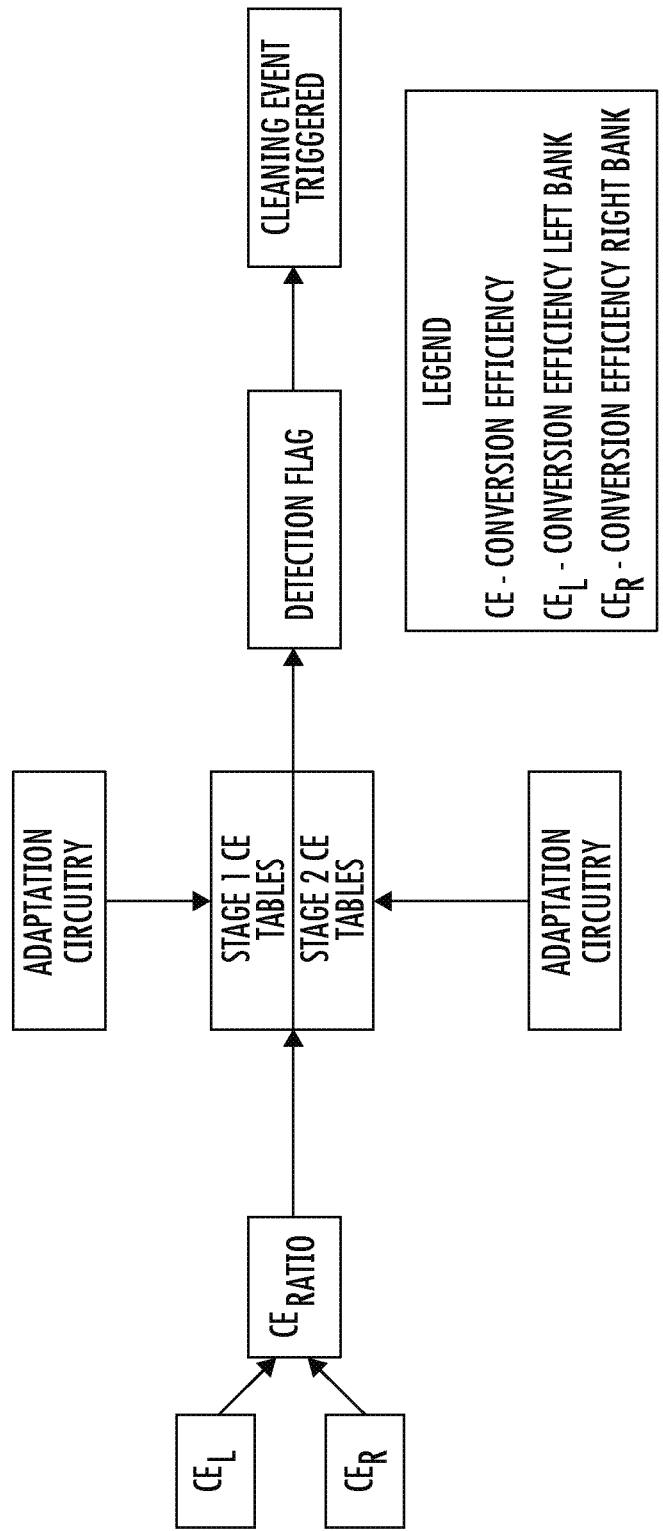
FIG. 6 is a schematic representation of a method of controlling an exhaust aftertreatment system, according to an embodiment.

In at least one embodiment, the controller may repeat the adaptation and/or calibration at different engine operating conditions to generate a table of values for the baseline calibration metric. In this way, the flow imbalance can be determined at whatever the current fueling rate and/or operating speed is for the engine. For example, the controller may adjust a fueling rate to the engine across several increments to generate a "curve" of baseline conversion metrics. The method 300 may further include generating tables (e.g., adaptation tables, empirically derived tables, etc.) of threshold values, as shown in FIG. 6 (shown as stage 1 tables and stage 2 tables), by multiplying each entry of the baseline conversion metric along the curve by a fixed percentage, and/or by scaling each entry using an empirically-derived correlation (e.g., test results showing the expected change in the conversion metric across different engine fueling rates at fixed values of lab induced flow imbalance). The threshold value at a given fueling rate may be determined by iterating (e.g., searching), by the controller, through the tables of threshold values (e.g., the first threshold, the second threshold, etc.) to determine the threshold value that corresponds to a real-time engine operating condition (e.g., a real-time fueling rate, etc.) and/or by interpolation between table entries. Once the adaptation is complete, the controller may change the state of the adaptation signal and/or flag in memory, which may persist until the flag is updated by a technician, and/or the controller is reset (e.g., memory flashed/erased to factory values).

As described above, method 300 includes taking different actions depending on which threshold is satisfied by the real-time conversion metric. At 308, the controller (e.g., the controller 202, the imbalance detection circuit 212, etc.) compares the real-time conversion metric with the first threshold value and/or the second threshold value. Operation 308 may include performing a Boolean operation between the real-time conversion metric and the first threshold value and/or the second threshold value. If the real-time conversion metric does not satisfy the first threshold value (at 310), then the method 300 returns to operation 302 (e.g., repeats). If the real-time conversion metric satisfies both the first threshold value and the second threshold value (at 312), then the method 300 proceeds to operation 314 to initiate a cleaning and/or regeneration cycle. In some embodiments, operation 308 includes comparing the real-time conversion metric to the second threshold value directly. For example, operation 308 is configured to be carried out without requiring a separate comparison between the real-time conversion metric and the first threshold value in some embodiments. In some embodiments, operation 308 includes initiating, by the controller (e.g., at 314), a cleaning operation to clean the aftertreatment system. In some embodiments, the cleaning operation is performed in response to a determination that the real-time conversion metric satisfies the second threshold value. In the embodiment of FIG. 5, if the real-time conversion metric satisfies the first threshold value but does not satisfy the second threshold value, then the method 300 proceeds to operation 316 to monitor the severity and/or duration of flow imbalance.

At 316, the controller (e.g., the controller 202, the imbalance detection circuit 212, etc.) initiates and/or updates the counter to track the flow imbalance. In at least one embodiment, operation 316 includes initiating and/or incrementing a timer that tracks an amount of time that the real-time conversion metric satisfies the first threshold value (e.g., the duration of the flow imbalance). The timer may be stored in memory and may be accessible for viewing through the I/O device by a technician or other operator. In another embodiment, operation 316 includes determining a cumulative sum of the flow imbalance over time. For example, operation 316 may include determining, by the controller, a real-time deviation between the real-time conversion metric and the baseline conversion metric (and/or the first threshold value) by calculating a difference between the real-time conversion metric and the baseline conversion metric (and/or the first threshold value). Operation 316 may further include calculating the cumulative imbalance by adding the real-time deviation to a historical deviation from a previous time step (e.g., by adding together the real-time deviation at each time step), and updating the counter based on the cumulative imbalance (e.g., by setting the counter equal to the cumulative imbalance over time). Among other benefits, evaluating the flow imbalance using a cumulative sum method more accurately accounts for the severity of the flow imbalance over time. In another embodiment, operation 316 may include determining a rate of change of the flow imbalance based on the change in an amount of the real-time conversion metric (e.g., flow imbalance) over time (e.g., a given or fixed time period).

In the embodiment of FIG. 5, the method 300 also includes comparing the counter to a deviation threshold, at 318. In at least one embodiment, the deviation threshold is a maximum amount of time (e.g., a maximum allowable duration) that the flow imbalance will be permitted before initiating a cleaning and/or regeneration cycle. In another embodiment (e.g., where operation 316 includes determining a cumulative sum of the flow imbalance over time), the deviation threshold is a maximum cumulative imbalance. In yet another embodiment (e.g., where operation 316 includes determining a rate of change of the flow imbalance), the deviation threshold is a maximum rate of change of the flow imbalance over a monitoring period (e.g., a fixed period stored in memory). In yet other embodiments, the deviation threshold is some combination of the time, cumulative imbalance, and/or the rate of change metrics. As shown in FIG. 5 (at 318), the controller will continue updating the counter until deviation threshold is satisfied, or until the second stage threshold is satisfied, at 312. In either case, the method 300 will proceed to 314 to initiate a cleaning and/or regeneration cycle for at least one leg of the aftertreatment system.

At 314, the controller (e.g., the controller 202, the cleaning control circuit 214, etc.) initiates a cleaning operation (e.g., controls a cleaning system to clean and/or regenerate the aftertreatment system. Operation 314 may include increasing the temperature of the exhaust gases entering and/or passing through at least one leg of the aftertreatment system. In at least one embodiment, operation 314 includes sending a control signal to the fuel injection system (e.g., to actuate a flow control valve, solenoid valve, etc.) and/or engine control unit to change injection timing, fuel rail pressure, charge flow, post fueling, and/or other engine system operating parameters. Operation 314 may include continuing control the engine system, as needed, to maintain the one or more legs of the aftertreatment system at a desired operating temperature for a given cleaning period (e.g., approximately 30 minutes or another suitable time period). Operation 314 may further include resetting (e.g., zeroing) the counter and returning to operation 302 to repeat the method 300.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIG. 4, it should be understood that the controller 202 may include any number of circuits for completing the functions described herein. For example, the activities and functionalities of the emissions monitoring circuit 210, the imbalance detection circuit 212, and/or the cleaning control circuit 214 may be combined in multiple circuits or as a single circuit. Additional circuits with additional functionality may also be included. Further, it should be understood that the controller 202 may further control other activity beyond the scope of the present disclosure.

As mentioned above and in one configuration, the "circuits" may be implemented in machine-readable medium for execution by various types of processors, such as processor 206 of FIG. 4. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, it should be understood that the term "processor" and "processing circuit" may be used to refer to a computer, a microcomputer, or portion thereof. In this regard and as mentioned above, the "processor" may be implemented as one or more application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated.

Other substitutions, modifications, changes and omissions may be made in the design, operating conditions and arrangement of the embodiments without departing from the scope of the present disclosure as expressed in the appended claims.

What is claimed is:

1. A method of controlling an aftertreatment system, comprising:
   receiving, by a controller, a plurality of emissions values from a plurality of sensors disposed in the aftertreatment system;
   determining, by the controller, a real-time conversion efficiency for each of a first leg and a second leg of the aftertreatment system based on the plurality of emissions values;
   determining, by the controller, a real-time conversion metric for the aftertreatment system based on the real-time conversion efficiency for the first leg and the second leg;
   comparing, by the controller, the real-time conversion metric to an upper threshold value; and
   initiating, by the controller, a cleaning operation to clean the aftertreatment system based on a determination that the real-time conversion metric satisfies the upper threshold value.

2. The method of claim 1, wherein the real-time conversion metric is indicative of at least one of a level of flow imbalance between the first leg and the second leg, or an amount of ammonia slip between the first leg and the second leg.

3. The method of claim 1, wherein the upper threshold value is determined based on a baseline conversion metric that is indicative of at least one of (i) a level of flow imbalance between at least two legs of a newly installed aftertreatment system portion or (ii) an amount of ammonia slip between the at least two legs of the newly installed aftertreatment system portion.

4. A method of controlling an aftertreatment system, comprising:
   receiving, by a controller, a plurality of emissions values from a plurality of sensors disposed in the aftertreatment system;
   determining, by the controller, a real-time conversion efficiency for one or more legs of the aftertreatment system based on the plurality of emissions values;
   determining, by the controller, a real-time conversion metric for the aftertreatment system based on the real-time conversion efficiency for the one or more legs;
   comparing, by the controller, the real-time conversion metric to an upper threshold value;
   initiating, by the controller, a cleaning operation to clean the aftertreatment system based on a determination that the real-time conversion metric satisfies the upper threshold value;
   comparing, by the controller, the real-time conversion metric to a lower threshold value;
   updating, by the controller, a counter in response to a determination that the real-time conversion metric satisfies the lower threshold value but does not satisfy the upper threshold value; and
   initiating, by the controller, the cleaning operation to clean the aftertreatment system in response to a determination that the counter satisfies a deviation threshold.

5. The method of claim 4, wherein updating the counter comprises:
   determining, by the controller, a real-time deviation between the real-time conversion metric and a baseline conversion metric;
   calculating, by the controller, a cumulative imbalance by adding the real-time deviation to a historical deviation; and
   updating, by the controller, the counter based on the cumulative imbalance.

6. The method of claim 4, wherein updating the counter comprises incrementing a timer that tracks an amount of time that the real-time conversion metric satisfies the lower threshold value.

7. The method of claim 4, wherein updating the counter comprises determining a rate of change of a flow imbalance in the aftertreatment system based on a change in an amount of the real-time conversion metric over time.

8. The method of claim 1, wherein initiating the cleaning operation comprises controlling, by the controller, an engine system to increase a temperature of an exhaust gas entering the first leg.

9. A method of controlling an aftertreatment system, comprising:
   receiving, by a controller, a plurality of emissions values from a plurality of sensors disposed in the aftertreatment system, wherein receiving the plurality of emissions values comprises:
      receiving, by the controller, an engine outlet NOx value from an engine outlet nitrogen oxide (NOx) sensor disposed upstream of the aftertreatment system;
      receiving, by the controller, a first system outlet NOx value from a first system outlet NOx sensor disposed in a first leg of the aftertreatment system; and
      receiving, by the controller, a second system outlet NOx value from a second system outlet NOx sensor disposed in a second leg of the aftertreatment system;
   determining, by the controller, a real-time conversion efficiency for one or more legs of the aftertreatment system based on the plurality of emissions values;
   determining, by the controller, a real-time conversion metric for the aftertreatment system based on the real-time conversion efficiency for the one or more legs;
   comparing, by the controller, the real-time conversion metric to an upper threshold value; and
   initiating, by the controller, a cleaning operation to clean the aftertreatment system based on a determination that the real-time conversion metric satisfies the upper threshold value.

10. The method of claim 1, wherein determining the real-time conversion efficiency of the first leg and the second leg comprises determining a reduction in an amount of NOx across each of the first leg and the second leg of the aftertreatment system relative to an amount of NOx entering the aftertreatment system.

11. The method of claim 1, further comprising:
   determining, by the controller, a relative blockage between the first leg and the second leg of the aftertreatment system; and
   prioritizing the first leg or the second leg to perform a blockage clearing action based on the determination of the relative blockage.

12. The method of claim 1, wherein comparing the real-time conversion metric to the upper threshold value comprises iterating, by the controller, through tables of threshold values to determine the upper threshold value that corresponds to a real-time engine operating condition.

13. A control system for an aftertreatment system, comprising:
   an engine outlet nitrogen oxide (NOx) sensor;
   a first system outlet NOx sensor configured to be disposed in a first leg of the aftertreatment system;
   a second system outlet NOx sensor configured to be disposed in a second leg of the aftertreatment system;
   a cleaning system configured to clean at least one leg of the aftertreatment system; and
   a controller communicably coupled to the engine outlet NOx sensor, the first system outlet NOx sensor, the second system outlet NOx sensor, and the cleaning system, the controller configured to:
      determine a first real-time conversion efficiency for the first leg based on data received from the engine outlet NOx sensor and the first system outlet NOx sensor;
      determine a second real-time conversion efficiency for the second leg based on data received from the engine outlet NOx sensor and the second system outlet NOx sensor;
      determine a real-time conversion metric for the aftertreatment system based on the first real-time conversion efficiency and the second real-time conversion efficiency; and
      control the cleaning system to initiate a cleaning operation to clean the aftertreatment system in response to the real-time conversion metric satisfying an upper threshold value.

14. The control system of claim 13, wherein the cleaning system comprises a fuel injection system, wherein controlling the cleaning system comprises transmitting a control signal to the fuel injection system to change at least one of injection timing, fuel rail pressure, charge flow, or post fueling.

15. An engine system comprising:
   an engine;
   an aftertreatment system comprising:
      an inlet pipe coupled to the engine;
      a first leg;
      a second leg; and
      a splitter pipe that extends between the inlet pipe and both the first leg and the second leg; and
   a control system comprising:
      an engine outlet nitrogen oxide (NOx) sensor disposed in the inlet pipe;
      a first system outlet NOx sensor disposed proximate an outlet of the first leg;
      a second system outlet NOx sensor disposed proximate an outlet of the second leg;
      a cleaning system configured to clean at least one of the first leg or the second leg; and
      a controller communicably coupled to the engine outlet NOx sensor, the first system outlet NOx sensor, the second system outlet NOx sensor, and the cleaning system, the controller configured to:
         determine a real-time conversion efficiency for at least one of the first leg or the second leg based on data received from the engine outlet NOx sensor, the first system outlet NOx sensor, and the second system outlet NOx sensor;
         determine a real-time conversion metric for the aftertreatment system based on the real-time conversion efficiency; and
         control the cleaning system to initiate a cleaning operation to clean the aftertreatment system in response to the real-time conversion metric satisfying an upper threshold value.

16. The method of claim 1, wherein determining the real-time conversion metric comprises dividing a maximum value of the real-time conversion efficiency of the first leg and the real-time conversion efficiency of the second leg with a minimum value of the real-time conversion efficiency of the first leg and the real-time conversion efficiency of the second leg.

17. The control system of claim 13, wherein the real-time conversion metric is indicative of at least one of a level of flow imbalance between the first leg and the second leg, or an amount of ammonia slip between the first leg and the second leg.

18. The control system of claim 13, wherein determining the real-time conversion metric comprises dividing a maximum value of the first real-time conversion efficiency and the second real-time conversion efficiency with a minimum value of the first real-time conversion efficiency and the second real-time conversion efficiency.

19. The engine system of claim 15, wherein the real-time conversion metric is indicative of at least one of a level of flow imbalance between the first leg and the second leg, or an amount of ammonia slip between the first leg and the second leg.

20. The engine system of claim 15, wherein determining the real-time conversion metric comprises dividing a maximum value of a first real-time conversion efficiency of the first leg and a second real-time conversion efficiency of the second leg with a minimum value of the first real-time conversion efficiency and the second real-time conversion efficiency.

* * * * *